United States Patent [19] [11] 4,033,429
Farr [45] July 5, 1977

[54] DOWNHOLE SEISMIC SOURCE
[75] Inventor: John B. Farr, Houston, Tex.
[73] Assignee: Standard Oil Company (Indiana), Chicago, Ill.
[22] Filed: Feb. 18, 1976
[21] Appl. No.: 659,072
[52] U.S. Cl. .............................. 181/106; 181/113; 181/120; 175/1; 340/15.5 BH
[51] Int. Cl.² ...................... G01V 1/04; G01V 1/40
[58] Field of Search .......... 181/102, 113, 106, 120; 175/1, 51, 76, 10.7, 230; 340/18 LD

[56] References Cited
UNITED STATES PATENTS
3,139,146  6/1964  Bodine, Jr. ......................... 175/107
3,845,837  11/1974  McEvers, Jr. et al. ............. 181/106

Primary Examiner—Howard A. Birmiel
Attorney, Agent, or Firm—Albert C. Metrailer; Arthur McIlroy

[57] ABSTRACT

Disclosed is a seismic source forming part of a drill string which allows geological prospecting while drilling a borehole. The source includes a section of drill pipe having a spiral cam machined into its outer surface and a port for allowing mud to flow from the inside of the drill pipe into the borehole. A sleeve surrounds this section of the drill pipe and includes a cam follower, a plurality of ports, and a spring borehole contact for preventing rotation of the sleeve. The sleeve blocks flow of mud through the drill pipe port, except when a sleeve port is in alignment therewith. When the sleeve cam follower is engaged in the drill pipe cam and the drill pipe is rotated, the drill pipe port follows a helical path relative to the sleeve and sequentially passes all the ports in the sleeve. Signal wave shape is determined by the configuration of the sleeve ports and frequency is determined by the drill pipe rotation rate.

12 Claims, 2 Drawing Figures

DOWNHOLE SEISMIC SOURCE

BACKGROUND OF THE INVENTION

This invention relates to a downhole seismic energy source for use in geophysical prospecting while drilling, and more particularly to a seismic source having its frequency controlled by pipe rotation rate.

In modern rotary drilling systems, downhole acoustic energy generators have been used for various purposes. A U.S. Pat. No. 3,309,656 issued to J. K. Godbey on Mar. 14, 1967, for a Logging-While-Drilling System illustrates one type of acoustic generator used for telemetering information from the bottom of the borehole to the surface through the mud column within the drill string. The transducer employed by Godbey is fully described in column 5 of his patent as a fluid dynamic transducer or, in more common terms, a siren. The basic element of this type of transducer is simply a valve which repetitively opens and closes to block or allow the flow of a fluid, which in this case is drilling mud.

U.S. Pat. No. 3,860,902 issued to E. M. Galle on Jan. 14, 1975, for a Logging Method and System illustrates a second basic type of transducer also used for telemetering information to the surface. The Galle transducer is a fluidic oscillator having no mechanical parts which move at the oscillation frequency. In this patent, the fluidic oscillator resonant frequency is in part determined by the borehole itself so that the frequency which is detected at the surface is an indication of some borehole characteristics. This same fluidic oscillator is also used in U.S. Pat. No. 3,876,016 issued to L. B. Stinson on Apr. 8, 1975, for a Method and System for Determining the Position of an Acoustic Generator in a Borehole. The Stinson disclosure is essentially a method of determining the deviation of a borehole from vertical by detecting at various points on the earth's surface the seismic signals generated by a downhole seismic source.

Geophysical prospecting has usually involved the generation of acoustic waves of the earth's surface and the detection at the earth's surface of reflections of these same waves from subsurface formations. Considerable energy is lost when the waves pass through the upper surface layers of the earth. This surface attenuation can be avoided by placing a seismic source in a borehole. As illustrated by the above-referenced patents, seismic sources have been used in boreholes but not for geophysical prospecting. While the Stinson disclosure involves the detection of seismic energy at the earth's surface, the detected waves have traveled directly from the source, through the earth, to the detector and have not been attenuated by a reflection at a subsurface interface. Borehole dimensions limit the size of a seismic source which may be placed down a borehole and, therefore, limits the amount of energy which may be contained in a seismic initiation. This problem of low-peak power initiations can be overcome if a low-peak energy frequency-swept signal of long time duration is used. This type of signal is commonly used in geophysical prospecting systems bearing the trademark Vibroseis, which is a registered trademark of the Continental Oil Company. These initiations must be of known wave shape to be of value since they are detected by cross-correlation techniques. The initiations must also be repeatable since a standard way of increasing signal level is to repeat a given initiation on the order of ten times, while summing the seismometer responses to each initiation. The presently available downhole seismic sources do not meet these two requirements for Vibroseis type seismic exploration.

SUMMARY OF THE INVENTION

Accordingly, an object of the present invention is to provide an improved downhole seismic source.

Another object of the present invention is to provide a downhole seismic source which generates a seismic initiation having a known wave shape.

Another object of the present invention is to provide a downhole seismic source which generates a seismic initiation which is controlled from the earth's surface.

These and other objects are achieved by providing a downhole seismic source comprising: a modified section of drill pipe having a rotary cam formed on its surface and a port for allowing mud to flow from inside the pipe to its outer surface; a cylindrical sleeve carried on the drill pipe section having a cam follower for engaging the drill pipe cam and a plurality of ports through which drilling fluid from the drill pipe port may pass; and, means attached to the sleeve for engaging a borehole wall to prevent rotation of the sleeve. The sleeve mud ports are arranged so that when the sleeve cam follower is engaged in the drill pipe rotary cam and the drill pipe is rotated, the drill pipe port sequentially passes each of the sleeve ports. Sleeve port spacing and drill pipe rotation rate exactly determine the wave pattern of the seismic initiations.

BRIEF DESCRIPTION OF THE DRAWINGS

The present invention may be more completely understood by reading the following detailed specification with reference to the accompanying drawings wherein.

DESCRIPTION OF THE PREFERRED EMBODIMENT

Figure 1:
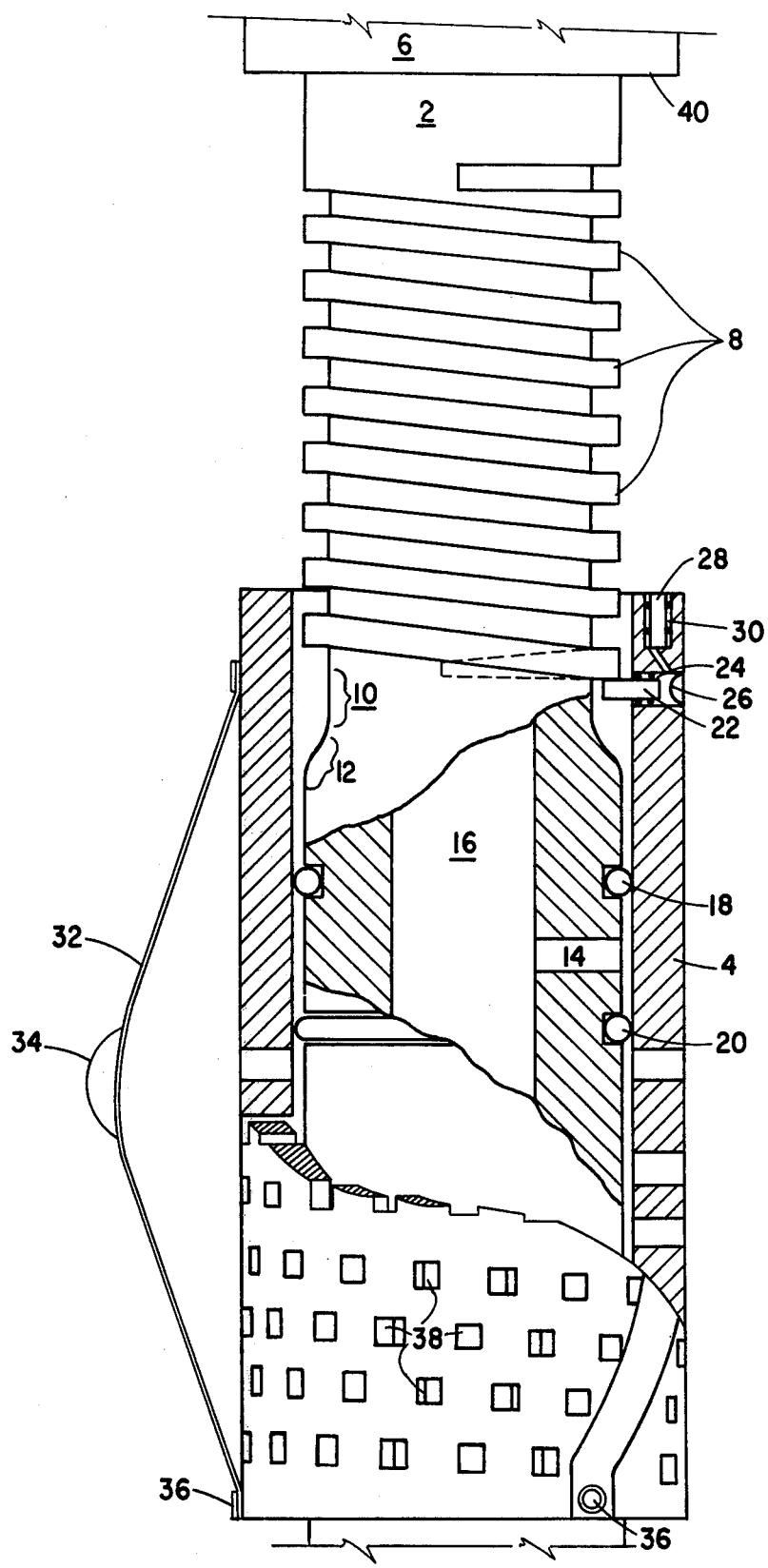
FIG. 1 is a partially cutaway view of a downhole seismic source according to the present invention.

With reference now to FIG. 1, there is shown a seismic source comprising a modified section of drill pipe 2 and a cylindrical sleeve 4 surrounding drill pipe section 2. A portion 6 of drill pipe 2 is at its original diameter, while the rest of the pipe has been reduced in diameter. A rotary cam 8 is formed in the upper portion of this reduced diameter section of drill pipe 2. Below cam 8, there is a reduced diameter dead section 10. Below this dead space 10, there is a ramp 12 by which the drill pipe is returned to the same outer diameter as rotary cam 8. Below ramp 12, there is a mud port 14 which allows mud to flow from the inside 16 of pipe 2 to its outer surface. A pair of O-ring seals 18 and 20 are spaced above and below, respectively, mud port 14 to prevent the leakage of mud through port 14 when sleeve 4 is in its idling position as will be explained further below. In the preferred embodiment, drill pipe section 2 continues on at its lower end to connect with the drill pipe section illustrated in FIG. 2.

The sleeve 4 (FIG. 1) is a hollow cylinder having an inner diameter larger than the outer diameter of the turned-down section of drill pipe 2 by enough to allow free rotation, but small enough to make a sealing contact with O-rings 18 and 20. Near its upper surface, sleeve 4 has a piston 22 carried in a cylinder 14 bored through the wall of sleeve 4. A diaphragm 26 seals the outer end of cylinder 24 which is filled with a hydraulic fluid. A second piston 28 is carried in a second cylinder 30 which is bored in the upper edge of sleeve 4. Cylinder 30 is in communication with cylinder 24. Both pistons 22 and 28 are sealed in their respective cylinders by O-ring seals to form a fluid-tight hydraulic chamber behind the pistons. As a result, the movement of either piston 22 or 28 into its cylinder tends to force the other piston from its cylinder. Diaphragm 26 acts as a spring for this hydraulic system so that it is possible by applying appropriate forces to hold both pistons 22 and 28 in their retracted positions simultaneously.

Three spring borehole contactors 32 are attached to the outer surface of sleeve 4 by, for example, rivets 36. As illustrated, contactors 32 are simply spring steel strips appropriately bowed by their positioning on sleeve 4. Each contactor 32 additionally has a rib or blade 34 attached at its outermost point to provide considerable resistance to rotation of sleeve 4, when the blade 34 is pressed into the borehole wall. The shape of blade 34 does allow axial movement of sleeve 4 within the borehole.

The lower portion of sleeve 4 has a plurality of ports 38 passing from its inner to outer surfaces. These ports 38 are positioned, in this preferred embodiment, along a helical path on the surface of sleeve 4 having a pitch identical to that of cam 8. In this preferred embodiment, the angular spacing between ports 38 along the helical path varies from a 15° spacing at one end of the helix to a 120° spacing at the other end of the helix. With this spacing and a drill pipe rotation rate of 120 rpm, a seismic initiation having a frequency sweep from 48 Hz to 6 Hz is generated. This frequency sweep is related to drill pipe rotation rates and may be varied by adjusting that rotation rate. For example, at a rate of 20 rpm the same hole pattern provides a frequency sweep from 8 Hz to 1 Hz. Likewise, at a rotation rate of 200 rpm, a frequency sweep of from 80 Hz to 10 Hz is generated.

In operation, the seismic source of FIG. 1 forms a part of a standard rotary drilling string and is positioned as near as possible to the drill bit. The body 2 of the source couples the mechanical forces to the drill bit and the conduit 16 conducts drilling fluid to the bit. During drilling operations, the sleeve 4 rests in the position as shown in FIG. 1. To produce a seismic initiation, the sleeve 4 must first be raised to its uppermost position. This is achieved by first lifting the entire drill string off of hole bottom by a distance of at least, for example, 10 feet. In this lifting operation, the spring contacts 32 provided enough downward drag to move sleeve 4 downward relative to drill pipe 2 by a sufficient distance for cam follower 22 to contact the ramp portion 12 of drill pipe 2. The ramp 12 forces cam follower 22 into cylinder 24 and by hydraulic action forces piston 28 upward out of cylinder 30. After the pistons 22 and 28 have thus been positiond, drill pipe 2 is lowered a distance of, for example, 5 feet and the resistance of springs 32 move sleeve 4 to a top position relative to drill pipe 2. When sleeve 4 reaches this top position, piston 28 is forced back into cylinder 30 by contact with a shoulder 40 at which drill pipe 2 returns to its original diameter at 6. When piston 28 is forced into cylinder 30, hydraulic pressure forces cam follower 22 into engagement with the top groove of cam 8. At this topmost position of sleeve 4, the bottom most sleeve port 38 is also in alignment with drill pipe port 14. The source is then ready to begin a seismic initiation. Drilling fluid pressure is maintained within conduit 16 in drill pipe 2, and the drill pipe is rotated at a preselected rate according to the frequency sweep which is desired and the hole pattern in sleeve 4. As drill pipe 2 rotates with cam follower 22 in engagement with cam 8, the sleeve 4 moves axially down drill pipe 2 because spring contacts 32 resist rotational motion of sleeve 4. Drill pipe port 14 sequentially passes each sleeve port 38 to generate a series of pressure pulses in siren-like fashion. Before cam follower 22 reaches the bottom of cam 28, the last sleeve port 38 passes pipe port 14 and continues on until it is below O-ring 20 when cam follower 22 reaches the bottom of cam 8. At this lowermost position, sleeve 4 in combination with rings 18 and 20 completely seal off port 14. The drill pipe may then be lowered to the bottom hole position to continue drilling or it may be lifted and lowered again for another initiation cycle.

Figure 2:
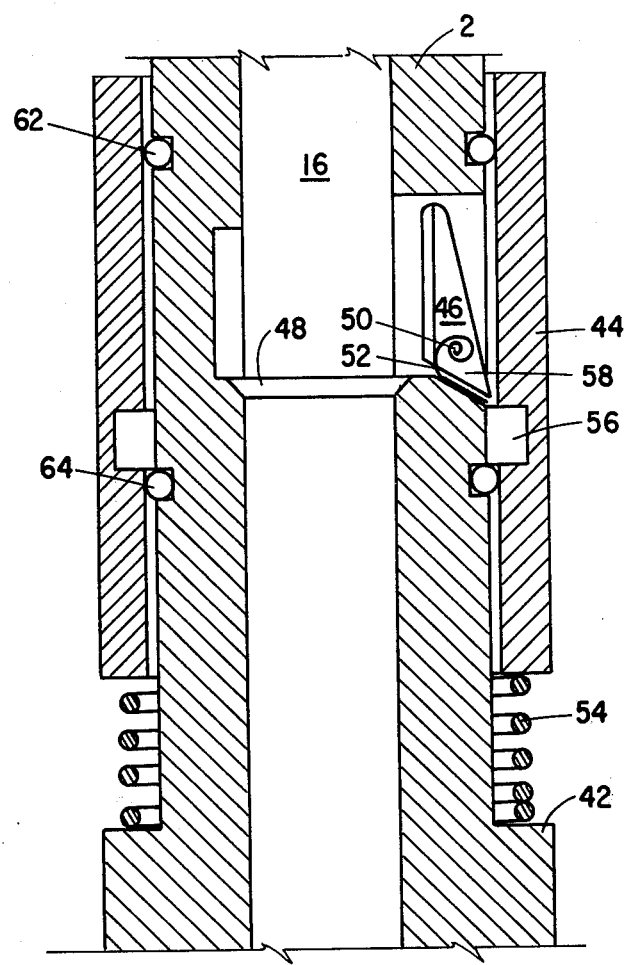
FIG. 2 is a cross-sectional view of a drilling fluid valve for use with the seismic source of FIG. 1.

With reference now to FIG. 2 there is shown a drilling fluid valve employed in the preferred embodiment to maximize the energy of pulses generated by the seismic source of FIG. 1. The drill pipe section 2 of FIG. 1 continues into FIG. 2 as illustrated by the broken lines at the bottom of FIG. 1 and the top of FIG. 2. Below the valve of FIG. 2, the drill pipe 2 returns to normal diameter at a shoulder 42. This valve basically includes a sleever 44, a valve plate 46, and a valve seat 48 formed on the inner surface of drill pipe 2. Valve plate 46 rotates about a pin 50 which is set into the drill pipe walls 2. A spring 52 urges valve plate 46 into its closed position. The sleeve 44 holds valve plate 46 in its open position when sleeve 44 is in its bottom or idling position as shown in FIG. 2. The top surface of sleeve 44 contacts the bottom surface of sleeve 4 (FIG. 1) when sleeve 4 is in its bottom or idling position. A coil spring is positioned between the lower edge of sleeve 44 and shoulder 42 of drill pipe 2. Spring 54 urges sleeve 44 upward to allow valve plate 46 to close whenever sleeve 4 (FIG. 1) is not holding sleeve 44 down. A groove 56 is cut out of the inner surface of sleeve 44 to allow valve plate 46 to close when sleeve 44 rises. This closing action occurs because an arm 58 of valve plate 46 extends into groove 56 when sleeve 44 is raised. A pair of O-rings 62 and 64 are positioned between drill pipe 2 and sleeve 44 above and below valve plate 46 to prevent leakage of mud from this valve assembly.

In operation, the spring 54 lifts sleeve 44 to allow valve plate 46 to seat in valve seat 48 when sleeve 4 (FIG. 1) is raised to its top position in preparation for a seismic initiation. When valve plate 46 is thus closed, all mud flow to the drill bit is cut off so that a relatively high mud pressure may be maintained in conduit 16 within drill pipe 2. In this manner, maximum energy is supplied to the seismic source of FIG. 1 without excessive mud flow. As the topmost port 38 in sleeve 4 passes by the drill pipe port 14 so that the sesimic initiation has ended, the bottom of sleeve 4 comes into contact with the top of sleeve 44 and forces sleeve 44 down so that the valve plate 46 is in its full open position when cam follower 22 reaches the bottom of cam 8.

It is apparent that many modifications of the preferred embodiment may be made within the scope of the present intention. The hole pattern in sleeve 4 (FIG. 1) may be modified to generate a wide variety of signal shapes. For example, a Fourier set of monofrequency bursts may be generated by the seismic source of FIG. 1 in two ways. One way is to use circular rows of slots in sleeve 4 in place of the disclosed helical row. Each circular row then has a constant angular spacing of all slots within the given row but each row is different from the next. The blank spaces between the rows provide dead signal periods which are necessary with this type of wave form. A second way is to place the slots in a helical path as illustrated in FIG. 1, but to cut the holes for a fixed distance, for example one and a half revolutions, at a fixed angular spacing between the slots followed by a dead space of, for instance, one-half revolution. This is then followed by a second set of slots having another angular spacing. It can be seen that the helical pattern does allow a greater variety of signal patterns, since the monofrequency bursts and the dead spaces may be of any desired lengths.

It is also apparent that the overall length of sleeve 4 may be increased or decreased as desired to provide any preselected total signal period. The length of sleeve 4 may also be increased for the purpose of repeating a given hole pattern so that two identical initiations may be generated in sequence without resetting sleeve 4. Two different patterns could also be included on one sleeve where, for instance, the first is used to exactly time the begining of the second. The length of cam 8 must also be adjusted accordingly. Other changes may also be made in the disclosed apparatus without departing from the scope of the present intention as defined by the appended claims.

I claim:

1. A seismic signal source for use in a borehole comprising:
    a section of drill pipe having a rotary cam on its outer surface and also having a port from the center to the outer surface of the section;
    a cylindrical sleeve positioned on a portion of said drill pipe section and having an inner diameter larger than the outer diameter of said drill pipe section, said sleeve having a cam follower for engagement with the cam in said drill pipe section to cause said sleeve to move axially a preselected distance relative to said drill pipe in response to rotation of said drill pipe, and said sleeve having a plurality of ports from its inner to outer surfaces, said ports spaced to pass sequentially by said drill pipe section port as said sleeve moves axially on said drill pipe; and,
    rotation preventing means attached to said sleeve and extending therefrom to contact a borehole wall for resisting rotation of said sleeve while allowing axial movement of said sleeve.

2. A seismic signal source according to claim 1 wherein the ports in said sleeve are arranged in a helical pattern having the same pitch as said rotary cam on the surface of said sleeve.

3. A seismic signal source according to claim 2 wherein the sleeve ports have an angular spacing which varies continuously from one end of the helical path to the other.

4. A seismic signal source according to claim 1 further including O-ring seals between said drill pipe and said sleeve positioned above and below said drill pipe port.

5. A seismic signal source according to claim 1 wherein said drill pipe includes a reduced diameter section below said rotary cam in which said cam follower rests at the end of a seismic initiation.

6. A seismic signal source according to claim 5 wherein said cam follower is a piston positioned in a cylinder in the wall of said sleeve.

7. A seismic signal source according to claim 6 further including cam retracting means for forcing the cam follower into its cylinder to disengage said cam whereby said sleeve may be moved axially to the top of said cam.

8. A seismic signal source according to claim 7 wherein said cam retracting means is a ramp on the surface of said drill pipe below the reduced diameter portion of said drill pipe whereby said cam follower is retracted by upward motion of said drill pipe relative to said sleeve.

9. A seismic signal source according to claim 7 further including cam extending means for forcing said cam follower from its cylinder in response to movement of said sleeve to the top of said cam.

10. A seismic signal source according to claim 9 wherein said cam extending means includes:
    a shoulder in said drill pipe above said rotary cam, and
    a cam extending piston positioned in a cylinder in the top edge of said sleeve, said cylinder being in communication with the cam follower cylinder and both cylinders being filled with hydraulic fluid, said cam extending piston being positioned to contact said shoulder when said sleeve is at the top of said rotary cam.

11. A seismic signal source according to claim 1 wherein said rotation preventing means in a plurality of bowed flat springs each having two ends attached to said sleeve and a center portion bowed out from said sleeve to contact the walls of a borehole.

12. A seismic signal source according to claim 1 further including a mud flow valve positioned below said drill pipe port and coupled to said cylindrical sleeve for stopping the flow of drilling fluid through said drill pipe beyond said drill pipe port, when said seismic signal source is generating a seismic initiation.

* * * * *

UNITED STATES PATENT OFFICE
CERTIFICATE OF CORRECTION

PATENT NO. : 4,033,429
DATED : July 5, 1977
INVENTOR(S) : John B. Farr

It is certified that error appears in the above-identified patent and that said Letters Patent are hereby corrected as shown below:

Column 2, line 67, "14" should read --24--.

Column 3, line 51 "provided" should read --provide--

Column 4, line 27, "sleever" should read --sleeve--;

Signed and Sealed this

Seventeenth Day of January 1978

[SEAL]

Attest:

RUTH C. MASON
Attesting Officer

LUTRELLE F. PARKER
Acting Commissioner of Patents and Trademarks